US010478728B2

(12) United States Patent
  Kurabayashi (10) Patent No.: US 10,478,728 B2
(45) Date of Patent: Nov. 19, 2019

(54) INFORMATION PROCESSING SYSTEM, SERVER, PROGRAM, AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 208 days.

(21) Appl. No.: 15/627,056

(22) Filed: Jun. 19, 2017

(65) Prior Publication Data

US 2017/0282073 A1 Oct. 5, 2017

Related U.S. Application Data

(63) Continuation of application No. PCT/JP2015/080705, filed on Oct. 30, 2015.

(30) Foreign Application Priority Data

Dec. 19, 2014 (JP) .................... 2014-257048

(51) Int. Cl.
  *A63F 13/497* (2014.01)
  *G06F 13/00* (2006.01)
  (Continued)

(52) U.S. Cl.
  CPC .......... *A63F 13/497* (2014.09); *A63F 13/352* (2014.09); *A63F 13/61* (2014.09);
  (Continued)

(58) Field of Classification Search
  USPC ........................................................ 463/42
  See application file for complete search history.

(56) References Cited

U.S. PATENT DOCUMENTS 9,053,105 B2  6/2015 Chatani
2012/0331112 A1* 12/2012 Chatani ................ H04N 21/254
                                                709/219

(Continued)

FOREIGN PATENT DOCUMENTS

JP   2002-191868 A   7/2002
JP   2004-302231 A   10/2004

(Continued)

OTHER PUBLICATIONS

Notice of Reasons for Rejection issued in JP Application No. 2014-257048, dated Mar. 10, 2015 (3 pages).

(Continued)

*Primary Examiner* — Pierre E Elisca
(74) *Attorney, Agent, or Firm* — Osha Liang LLP (57) ABSTRACT

It is an object of the present invention to enable a player playing a game to readily view an image that may serve as a reference for the game. A server 1 carries out communications with a terminal 2-2 that generates metadata when needed during the execution of a game, the metadata including one or more kinds of attribute information. A management unit 11 manages one or more sets of data, the sets of data each including: image data related to the game or location data of the image data, and the metadata. A correlation calculating unit 21 calculates a correlation between metadata generated by the terminal 2-2 at a certain timing and the metadata included in each of the one or more managed sets. An image-sending control unit 22 sends, to the terminal 2-2, the image data or location data included in the same set as metadata whose correlation satisfies a predetermined criterion.

10 Claims, 5 Drawing Sheets

(51) Int. Cl.
  *H04N 21/258*   (2011.01)
  *H04N 21/2668*  (2011.01)
  *A63F 13/61*    (2014.01)
  *A63F 13/352*   (2014.01)
  *G06Q 30/00*    (2012.01)
  *G06Q 30/02*    (2012.01)

(52) U.S. Cl.
  CPC ............ *G06F 13/00* (2013.01); *G06Q 30/00* (2013.01); *G06Q 30/0205* (2013.01); *G06Q 30/0261* (2013.01); *H04N 21/258* (2013.01); *H04N 21/2668* (2013.01)

(56) References Cited

U.S. PATENT DOCUMENTS

| | | | |
|---|---|---|---|
| 2014/0094302 A1 | 4/2014 | Wilkiewicz et al. | |
| 2014/0228112 A1 | 8/2014 | Laakkonen et al. | |
| 2017/0157512 A1* | 6/2017 | Long | A63F 13/497 |
| 2017/0312614 A1* | 11/2017 | Tran | H04W 4/027 |
| 2018/0132011 A1* | 5/2018 | Shichman | H04N 21/234 |
| 2018/0247134 A1* | 8/2018 | Bulzacki | G06K 9/00771 |
| 2019/0035210 A1* | 1/2019 | Bulzacki | A63F 3/00157 |

FOREIGN PATENT DOCUMENTS

| | | |
|---|---|---|
| JP | 2010-046159 A | 3/2010 |
| JP | 2011-221967 A | 11/2011 |

OTHER PUBLICATIONS

Decision of Rejection issued in JP Application No. 2014-257048, dated Aug. 11, 2015 (2 pages).

International Search Report issued in Application No. PCT/JP2015/080705, dated Nov. 24, 2015 (2 pages).

Written Opinion issued in Application No. PCT/JP2015/080705, dated Nov. 24, 2015 (5 pages).

* cited by examiner

INFORMATION PROCESSING SYSTEM, SERVER, PROGRAM, AND INFORMATION PROCESSING METHOD

TECHNICAL FIELD

The present invention relates to information processing systems, servers, programs, and information processing methods.

BACKGROUND ART

Recently, in order to share game experience on terminals such as smartphones among players, a large number of video data created by recording game screens during play have been uploaded on the Internet (see Patent Literatures 1 and 2). An environment for this purpose is being established, and many development tools for recording such video data are being provided.

Generally, video data generated by recording game screens during play are often called "play-videos." In addition to such video data, there is also another type of video data, which is generated by capturing video of a player himself or herself together with the proceedings of a game. Generally, such video data is called "Let's Play." Hereinafter, however, these types of video data, including "Let's Play," will be collectively referred to as "play-videos." That is, in this specification, "play-videos" are a broad concept meaning images representing the proceedings of a certain game.

Patent Document 1: Specification of United States Patent Application, Publication No. 2014/0094302
Patent Document 2: Specification of United States Patent Application, Publication No. 2014/0228112

DISCLOSURE OF THE INVENTION

Problems to be Solved by the Invention

With only the existing technologies, including those of Patent Literatures 1 and 2, however, it is difficult for a player playing a game to find a play-video that may serve as a reference for him or her, and he/she must inevitably depend on walkthrough websites, etc. This situation also leads to problems for game providers, such as the problem that the number of views of play-videos for games being provided does not increase or the problem that players tend to leave games (in order to view walkthrough websites, etc.). It is to be noted that image data that serves as a reference for a player playing a game is not particularly limited to play-videos and may include any image data related to the game. However, it is nonetheless difficult for a player to find such image data.

The present invention has been made in view of the situation described above, and it is an object thereof to enable a player playing a game to readily view an image that may serve as a reference for the game.

Means for Solving the Problems

In order to achieve the above object, an information processing system according to an aspect of the present invention is an information processing system including a plurality of terminals that can execute a game and also including a server, wherein the server includes: a management unit for managing one or more sets of data, the sets of data each including: image data related to the game or location data of the image data, and metadata including one or more kinds of attribute information that is obtained during the execution of the game; a correlation calculating unit for calculating a correlation between metadata generated by a certain terminal among the plurality of terminals and the metadata included in each of the one or more managed sets; and an image-sending control unit for executing control to send, to the certain terminal, the image data or location data included in the same set as metadata whose correlation satisfies a predetermined criterion, and wherein the certain terminal includes: a generating unit for generating metadata when needed during the execution of the game; a metadata sending control unit for executing control to send, to the server, metadata generated at a certain timing during the execution of the game; and a display control unit for controlling display of image data or image data identified from location data sent from the server on the basis of the sent metadata.

This enables a player (user) playing a game to readily view, as an image that may serve as a reference for the game, for example, image data associated with metadata whose correlation with metadata generated during the execution of the game satisfies a predetermined criterion.

A server according to an aspect of the present invention is a server that carries out communications with a user terminal that generates metadata when needed during the execution of a game, the metadata including one or more kinds of attribute information, the server including: a management unit for managing one or more sets of data, the sets of data each including: image data related to the game or location data of the image data, and the metadata; a correlation calculating unit for calculating a correlation between metadata generated by the user terminal at a certain timing and the metadata included in each of the one or more managed sets; and a sending unit for sending, to the user terminal, the image data or location data included in the same set as metadata whose correlation satisfies a predetermined criterion.

This enables a player (user) playing a game to readily view, as an image that may serve as a reference for the game, image data, etc. associated with metadata whose correlation with metadata generated during the execution of the game satisfies a predetermined criterion.

Furthermore, the metadata may include metadata representing a progress status of the game and metadata representing a status of a player in the game.

This enables a player (user) playing a game to readily view, as an image that may serve as a reference for the game, image data, etc. having correlation with the progress status of the game or the status of the player.

Furthermore, the metadata may be represented by a vector in a high-dimensional vector space. Furthermore, the correlation calculating unit may calculate, as the correlation, the distance, in the high-dimensional vector space, between a vector representing the obtained metadata and a vector representing the metadata included in each of the one or more managed sets.

Since this enables calculation of a suitable correlation, a game player can view image data that serves as a more useful reference.

Furthermore, the certain timing at which the user terminal generates metadata may be a timing at which a certain event occurs during the execution of the game.

This enables a player of a game to view image data that serves as a reference for a certain event that occurred during the execution of the game. For example, in the case where an event that is disadvantageous for the player occurred, such as a game over, the game player can view a video, etc. that serves as a hint for clearing the event.

Furthermore, the image data or image data identified from the location data managed by the management unit may include image data representing the proceedings of the game executed in the past by at least one of a plurality of terminals.

This enables a player of a game to view, as image data that serves as a reference, for example, image data (play-video, etc.) representing the proceedings of the game experienced in the past by another player in a situation similar to that of the player.

The image data or image data identified from the location data managed by the management unit may include image data representing an advertisement or official announcement related to the game.

This enables a user to also view advertisements or official announcements related to a game as images that serve as references. On the other hand, game providers can present advertisements or official announcements effectively.

A non-transitory computer readable medium storing a program corresponding to the above server according to an aspect of the present invention is also provided as a first program according to an aspect of the present invention.

A non-transitory computer readable medium storing a second program according to an aspect of the present invention is a program that is executed by a computer that controls a terminal in the above-described information processing system according to an aspect of the present invention. Specifically, the second program is a program for a computer that controls a terminal that carries out communications with a server having: a management function of managing one or more sets of data, the sets of data each including: image data related to a game or location data of the image data, and metadata including one or more kinds of attribute information that is obtained during the execution of the game; and a sending function of sending, to another terminal, the image data or location data included in the same set as metadata whose correlation with metadata generated by the other terminal satisfies a predetermined criterion among the metadata included in the one or more managed sets, the program causing the computer to execute control processing including: a generating step of generating metadata when needed during the execution of the game; a communication control step of executing control to send, to the server, metadata generated at a timing satisfying a predetermined condition during the execution of the game, and to receive image data or location data sent from the server by using the sending function on the basis of the sent metadata; and a display control step of controlling display of the received image data or image data identified from the received location data.

This enables a player (user) playing a game to readily view, as an image that may serve as a reference for the game, image data, etc. associated with metadata whose correlation with metadata generated during the execution of the game satisfies a predetermined criterion.

An information processing method corresponding to the second program according to an aspect of the present invention is also provided as an information processing method according to an aspect of the present invention.

Effects of the Invention

According to the present invention, a player playing a game can readily view an image that may serve as a reference for the game.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images." Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
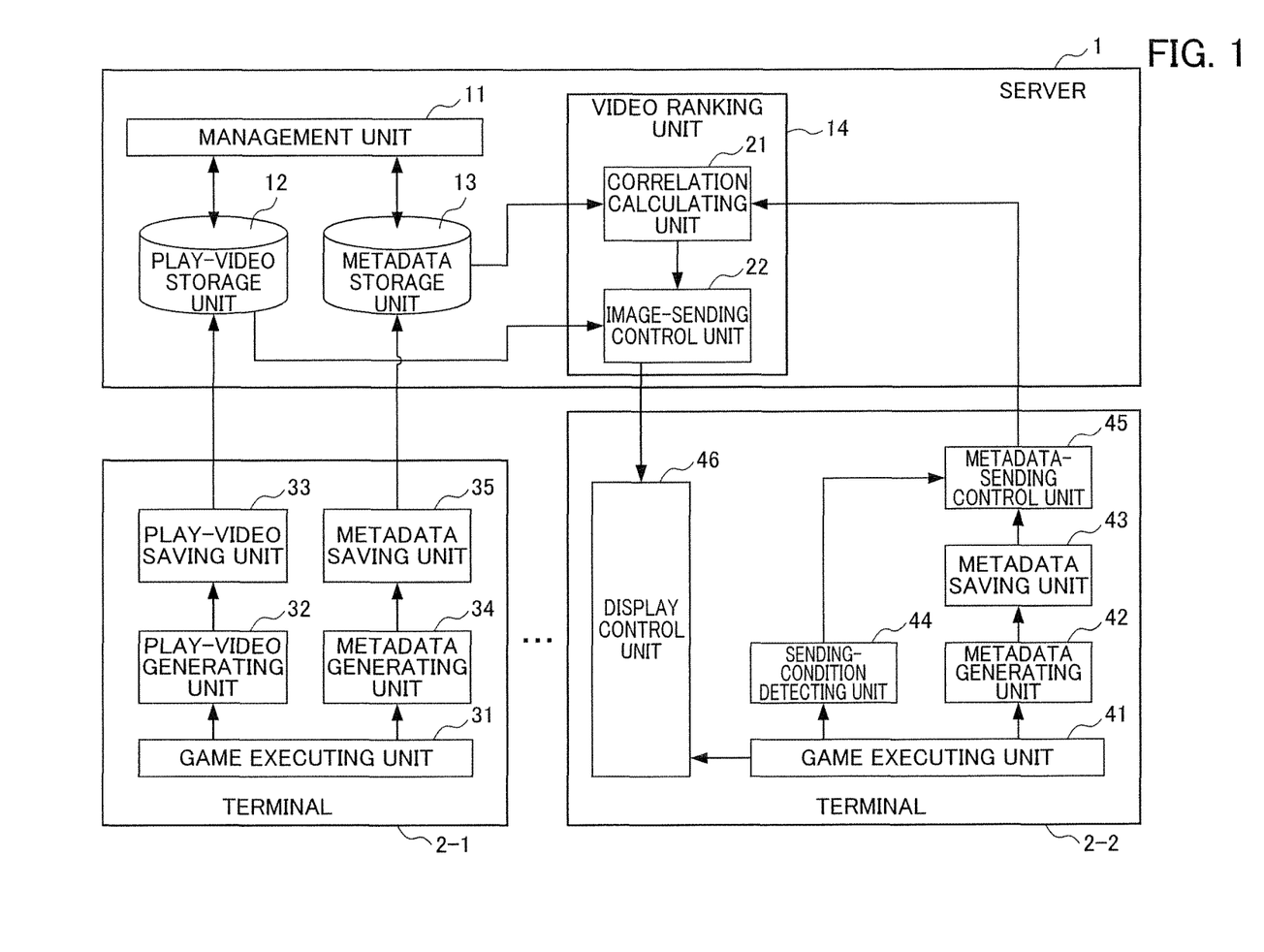
FIG. 1 is a functional block diagram showing the functional configuration of an information processing system according to an embodiment of the present invention.

FIG. 1 shows the configuration of an information processing system according to an embodiment of the present invention. The information processing system shown in FIG. 1 is configured by individually connecting a server 1 and terminals 2-1 and 2-2 to each other via a predetermined network, such as the Internet, which is not shown. In FIG. 1, only two terminals 2-1 and 2-2 are shown for ease of explanation of the present invention. In practice, a large number of terminals may be connected to the server 1 in the information processing system.

Each of the server 1 and the terminals 2-1 and 2-2 in this embodiment is applied to a computer and peripheral devices thereof. The individual units in this embodiment are implemented by hardware provided in computers and peripheral devices thereof, as well as by software for controlling the hardware.

The hardware includes a CPU (Central Processing Unit) that serves as a control unit, and also includes a storage unit, a communication unit, a display unit, and an input unit. Examples of the storage unit include a memory (RAM: Random Access Memory, ROM: Read Only Memory, etc.), an HDD (Hard Disk Drive), and an optical disk (CD: Compact Disk, DVD: Digital Versatile Disk, etc.) drive. Examples of the communication unit include various types of wired and wireless interface devices. Examples of the display unit include various types of displays, such as a liquid crystal display. Examples of the input unit include a keyboard and a pointing device (a mouse, a trackball, etc.).

Each of the terminals 2-1 and 2-2 in this embodiment is implemented as a smartphone and is provided with a touchscreen that serves as both an input unit and a display unit. For example, the input unit of the touchscreen is constituted of capacitive or resistive position input sensors that are stacked in the display area of the display unit, which detect the coordinates of a position at which a touch operation is performed. The touch operation here refers to bringing something (a user's finger, a stylus, etc.) into contact with or in proximity to the touchscreen (more specifically, the input unit thereof) serving as a display medium. Hereinafter, a position at which a touch operation is performed will be referred to as a "touched position," and the coordinates of the touched position will be referred to as "touched coordinates."

Furthermore, the software includes computer programs and data for controlling the hardware. The computer programs and data are stored in the storage unit and are executed or referred to as appropriate by the control unit. Furthermore, the computer programs and data can be distributed either via a communication line or as recorded on a computer-readable medium, such as a CD-ROM.

Each of the server 1 and the terminals 2-1 and 2-2 has a functional configuration shown in FIG. 1 in order to enable various operations through cooperation between the hardware and software described above.

The server 1 includes a management unit 11, a play-video storage unit 12, a metadata storage unit 13, and a video ranking unit 14.

The management unit 11 manages one or more sets of data, the sets of data each including: image data related to a certain game or location data of the image data, and metadata including one or more kinds of attribute information that is obtained during the execution of the game.

In this embodiment, play-videos are adopted as image data related to the certain game, and the play-videos are stored in the play-video storage unit 12. Here, although it is shown in FIG. 1 as if play-videos were generated only by the terminal 2-1, in practice, play-videos may be generated by any terminal (including the terminal 2-2) connected to the server 1. Thus, in this embodiment, the management unit 11 manages a plurality of play-videos stored in the play-video storage unit 12. As will be described later in detail, the storage location of play-videos is not particularly limited to the play-video storage unit 12 and may be a location other than the server 1. In such a case where play-videos are stored at a location other than the server 1, data (e.g., a URL) representing the location is managed by the management unit 11 as location data.

A plurality of pieces of metadata individually associated with such a plurality of play-videos are stored in the metadata storage unit 13. Metadata in this embodiment includes metadata representing a game progress status and metadata representing a game player status, as described later in detail with a specific example. That is, metadata representing the game progress status and player status at the time of generation of a play-video is stored in the metadata storage unit 13 in association with the play-video. Thus, the management unit 11 manages the individual associations (sets each consisting of play-video and metadata) between the individual play-videos stored in the play-video storage unit 12 and the individual pieces of metadata stored in the metadata storage unit 13.

The video ranking unit 14 includes a correlation calculating unit 21 and an image-sending control unit 22.

The correlation calculating unit 21 calculates a correlation between metadata generated by a certain terminal (the terminal 2-2 in the example in FIG. 1) among a plurality of terminals and the metadata included in each of the one or more sets managed by the management unit 11 (the metadata stored in the metadata storage unit 13 in the example in FIG. 1). The correlation will be described later in detail with a specific example.

The image-sending control unit 22 executes control to send, to the certain terminal (the terminal 2-2 in the example in FIG. 1), the image data or location data included in the same set as metadata whose correlation satisfies a predetermined criterion. Here, the metadata whose correlation satisfies a predetermined criterion refers to metadata involving a game progress status and player status similar to those at the time of generation of the metadata by the certain terminal (the terminal 2-2 in the example in FIG. 1) among the metadata stored in the metadata storage unit 13. That is, the image data, etc. sent from the image-sending control unit 22 to the terminal 2-2 is a play-video, etc. representing the proceedings of a game play executed with a game progress status and player status similar to those at the time of generation of the metadata at the terminal 2-2 (the proceedings of a play that is the experience of another player in the past). For the player at the terminal 2-2, it serves as a reference for proceeding with the game to view such a play-video involving a similar game progress status and player status.

The terminal 2-2 includes a game executing unit 41, a metadata generating unit 42, a metadata saving unit 43, a sending-condition detecting unit 44, a metadata-sending control unit 45, and a display control unit 46.

The game executing unit 41 executes a certain game. The metadata generating unit 42 generates metadata when needed during the execution of the certain game. The metadata saving unit 43 saves the metadata that is generated when needed, as described above. That is, while the game progress status and player status change as time passes, metadata representing the game progress status and player status is obtained and saved when needed (in real time). The sending-condition detecting unit 44 detects whether or not a condition for sending such metadata obtained in real time to the server 1 (hereinafter referred to as the "sending condition") is satisfied. The metadata-sending control unit 45 executes control to send, to the server 1, metadata generated at a certain timing during the execution of the game. In this embodiment, the timing when the sending condition is satisfied corresponds to the certain timing. That is, in this embodiment, although metadata is generated in real time when needed, the metadata is not always sent to the server 1 but is sent at a timing when the sending condition is satisfied.

The display control unit 46 controls display of the image data or image data identified from the location data sent from the server 1 on the basis of the sent metadata. Here, the image data, etc. sent from the server 1 is a play-video, etc. involving a game progress status and player status similar to those at the time of satisfaction of the sending condition. Here, it is assumed that a situation that is disadvantageous for the player playing the game at the certain terminal (the terminal 2-2 in the example in FIG. 1), such as a situation in which the player cannot proceed with the game, like a situation involving repeated game overs, is adopted as the sending condition. In this case, the player can continue playing the game so as to get out of such a disadvantageous situation with reference to a play-video of another player without having to depend on a walkthrough website, etc., i.e., without having to suspend the game.

The terminal 2-1 includes a game executing unit 31, a play-video generating unit 32, a play-video saving unit 33, a metadata generating unit 34, and a metadata saving unit 35.

The game executing unit 31 executes the certain game. The play-video generating unit 32 generates a play-video at a certain timing during the execution of the game, for example, at the time of occurrence of a certain event. The play-video saving unit 33 saves the generated play-video. The play-video is uploaded to the server 1 as needed and stored in the play-video storage unit 12. The metadata generating unit 34 generates metadata during the execution of the certain game, at least when a play-video is generated. The metadata saving unit 35 saves the generated metadata. The metadata is uploaded to the server 1 and stored in the metadata storage unit 13 when the associated play-video is uploaded to the server 1.

Figure 2:
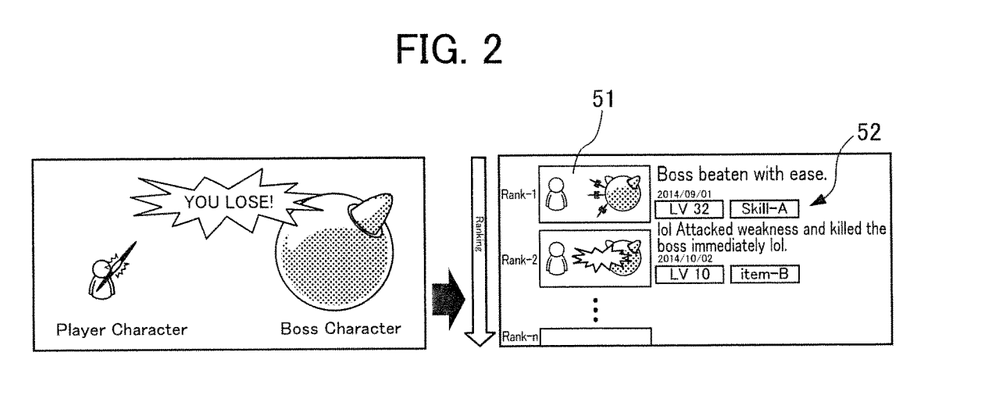
FIG. 2 is an illustration showing an example of a play-video recommendation screen displayed on a terminal in FIG. 1 and a timing at which the play-video recommendation screen is displayed.

The information processing system according to this embodiment will be further described in detail below with reference to FIG. 2 and the subsequent figures. FIG. 2 is an illustration showing an example of a timing at which a play-video recommendation function is activated and a play-video recommendation screen that is displayed at the time of the activation at the terminal 2-2 in this embodiment. The screen on the left side of FIG. 2 is a screen for an event in which a player character has been defeated by a boss character. The screen on the right side of FIG. 2 is a play-video recommendation screen displayed by being triggered by the event.

The play-video recommendation screen is a screen in which a maximum of a predetermined number of play-videos having high relevance to the player's situation up to a certain event are displayed as recommended videos in the form of a ranking. Here, it is assumed that the ranking becomes higher as the correlation becomes higher. Here, a play-video on the occasion when another player had no difficulty in beating an enemy character that is very difficult to beat is displayed at the top rank.

The play-video recommendation function is a function that is triggered by an event such as a player reaching an impasse in proceeding with the game and that provides a recommendation for viewing a play-video that has high relevance to the situation at the time of occurrence of the event and thus will serve as a reference for the player.

Specifically, upon the occurrence of an event such as a player reaching an impasse in proceeding with the game, in this example, the sending-condition detecting unit 44 detects that the sending condition, described earlier, has been satisfied. Then, the metadata generated at the time of the occurrence of the event, i.e., metadata representing the situation, etc. at the time of the occurrence of the event, is sent to the server 1. Then, a plurality of play-videos associated with metadata whose correlation with the sent metadata satisfies a predetermined condition, i.e., a plurality of play-videos that have high relevance to the situation at the time of the occurrence of the event and thus will serve as a reference for the player, are sent from the server 1. Then, the display control unit 46 displays a play-video recommendation screen in which the play-videos are listed as recommended videos in the form of a ranking.

The player at the terminal 2-2 can perform an operation to select a desired recommended video 51 (the recommended video 51 may be a thumbnail image) from the list of recommended videos in the play-video recommendation screen and view the recommended video 51.

Furthermore, in the play-video recommendation screen in this embodiment, tags 52 representing predetermined attribute information (metadata elements) are also displayed for each recommended video. Although the attribute information is not particularly limited as long as it is included as elements in the metadata, information representing the status of a player character, such as the level, owned skills, and owned items, is preferable since such information will serve as a reference for the player at the user terminal 2-2.

Figure 3:
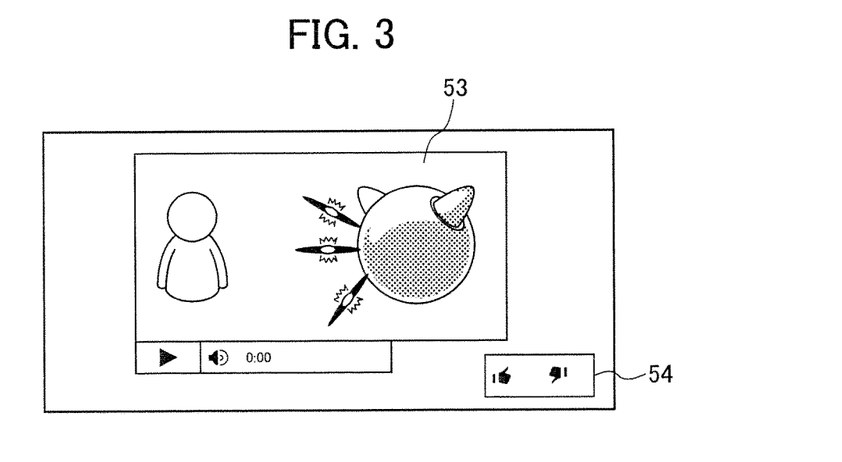
FIG. 3 is an illustration showing a play-video that is displayed on the terminal in FIG. 1 when a thumbnail image for a video is tapped in the play-video recommendation screen in FIG. 2.

FIG. 3 shows an example of a playback screen that is displayed in the case where the top-ranked recommended video 51 is selected in FIG. 2. At this time, in the case where the player perceives the recommended video 51 as a video being useful for clearing the event or a video involving a superior play, the player can perform an operation for sending social feedback, such as "Good!" or "Like!" Then, the player can return to the game immediately by performing an operation for closing the play-video recommendation screen. Being able to research the game by viewing a play-video that serves as a hint, without having to suspend the game, is an advantage for the player (user) and is also an advantage for the game provider in that the user is prevented from leaving the game.

Here, for the purpose of calculation of the relevance (correlation of metadata) between the situation at the time of the occurrence of the event at the terminal 2-2 (when the sending condition was satisfied) and a play-video that is to be recommended by the server 1, it is desirable if there are metadata <P,Q> representing the situation at the time of the occurrence of the event and metadata <R,S> representing the situation at the time of recording of the play-video. Here, of the two kinds of metadata <P,Q> and <R,S>, elements P and R are metadata representing player statuses, and elements Q and S are metadata representing game progress statuses.

First, the metadata P and R representing player statuses are n-dimensional vector representations of attribute information in the game, such as player levels, various parameters, owned items, and owned skills, as expressed in Eq. 1 below.

$$P := \langle p_1, p_2, \ldots, p_n \rangle$$
$$R := \langle r_1, r_2, \ldots, r_n \rangle \quad (1)$$

Here, elements $p_i$ and $r_i$ signify real numbers in a range of 0 to 1, corresponding to the i-th attributes in the attribute information of players in the game. These values should preferably be infinity-norm normalized. For example, in the case of a game in which the maximum level is 100, it is possible to represent Level 1 as 0.01 and Level 100 as 1 by normalizing the values of levels to the maximum value. Furthermore, when representing the number of owned items of the type whose value increases as the number increases, the number of items can be normalized to the maximum number that can be owned. There are cases where the number of these attributes is on the order of hundreds to thousands, depending on the nature of the game. For example, when there are 500 kinds of items and 500 kinds of skills in a game, the value of n becomes at least 1000.

Figure 4:
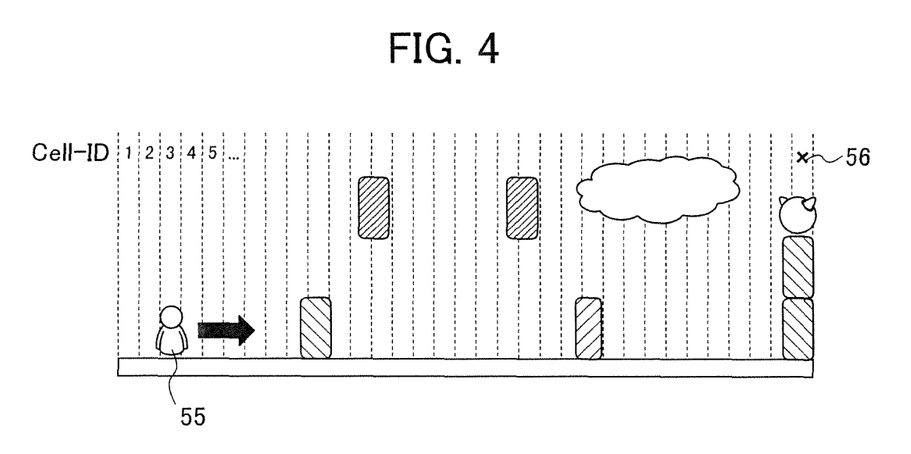
FIG. 4 is an illustration showing, as an example of metadata representing a game progress status, a finite number of cell IDs representing positions reached by a player on the terminal in FIG. 1.

Next, the metadata Q and S representing game progress statuses are represented as sets of data representing game progress statuses or positions in the virtual space of the game. As an example, FIG. 4 is an illustration showing a finite number of cell IDs representing positions reached by a player in a horizontally scrollable action game. Cell IDs are IDs assigned to cells 56 defined by dividing the space (image) from the start to the end of a certain stage at regular intervals with respect to the horizontal direction. The cell IDs can be used as positions of (positions reached by) a player character 55. Thus, sequences of cell IDs can be included in the metadata Q and S. As another example, in the case of an RPG (Role-Playing Game), since game progress statuses are represented by using a finite number of scene numbers, sequences of scene numbers can also be included in the metadata Q and S.

As described above, since ordinary game software includes built-in flags or IDs for managing game progress statuses, the metadata Q and S representing game progress statuses can be readily defined by using such data and expressed as m-dimensional vectors, as expressed in equation (2) below.

$$Q := \{q_1, q_2, \ldots, q_n\}$$
$$S := \{s_1, s_2, \ldots, s_n\} \quad (2)$$

Here, the values of elements $q_i$ and $s_i$ become 1 in the case where play-videos include the i-th statuses among the game progress statuses of players and otherwise become 0. In the case of the metadata Q, the play-video refers to a play-video in the case where it is assumed that the situation up to the time of the occurrence of the event at the terminal 2-2 is recorded.

By calculating the correlation between these pieces of metadata represented as vectors in the high-dimensional vector space, it is possible to evaluate the degree of relevance between the situation at the time of the occurrence of the event and a play-video.

First, it is assumed in this embodiment that the correlation between the metadata P and R representing player statuses is defined in the form of the most general calculation method by a correlation function expressed in equation (3) below.

$$\text{score}(P, R) = \sum_{i=1}^{n} (P_i \cdot R_i) \quad (3)$$

As is apparent from the above description, score(P,R) is a correlation representing the degree of similarity between the statuses of the player at the terminal 2-2 and the player who uploaded the play-video.

Next, it is assumed in this embodiment that the correlation between the metadata Q and S representing game progress statuses is defined by a correlation function expressed in equation (4) below, which is similar to equation (3).

$$loc(Q, S) = \sum_{i=1}^{m} (Q_i \cdot S_i) \quad (4)$$

As is apparent from the above description, loc(Q,S) is a correlation representing the degree of similarity between the current game progress status at the terminal 2-2 and the game progress status recorded in the play-video.

From these two correlations, a ranking of play-videos similar to the situation at the time of the occurrence of the event is determined according to equation (5) below.

$$\text{relevance}(<P,Q>, <R,S>) := loc(Q,S) \cdot \text{score}(P,R) | loc(Q,S) > t \leftarrow \quad (5)$$

That is, for each play-video whose loc(Q,S) exceeds a predetermined threshold t, loc(Q,S) and score(P,R) are calculated, and a final correlation relevance(<P,Q>,<R,S>) is determined by calculating the product of these values.

Figure 5:
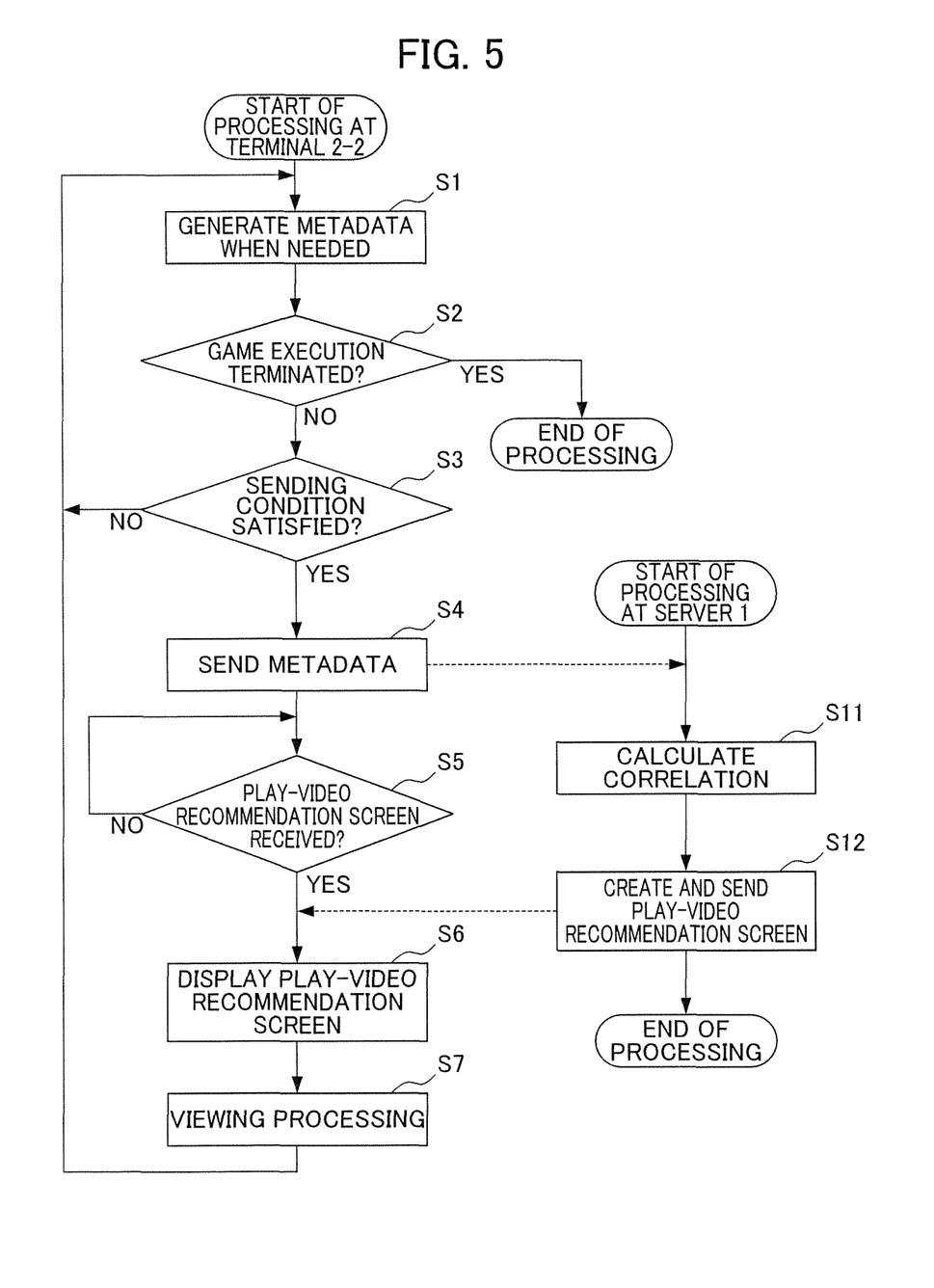
FIG. 5 is a flowchart showing play-video recommendation processing that is executed between a server and the terminal in FIG. 1.

Next, processing for recommending a play-video to a player through cooperation between the server 1 and the terminal 2-2 (hereinafter referred to as "play-video recommendation processing") will be described. FIG. 5 is a flowchart for explaining the flow of the play-video recommendation processing according to this embodiment.

The play-video recommendation processing at the terminal 2-2 is started when triggered by the user starting to play the game at the terminal 2-2.

In step S1, the metadata generating unit 42 of the terminal 2-2 generates metadata when needed as the game progresses and saves the metadata in the metadata saving unit 43.

In step S2, the game executing unit 41 determines whether or not the execution of the game has been terminated. In the case where the game has been terminated, the determination in step S2 results in YES, and the play-video recommendation processing is terminated. On the other hand, in the case where the player is continuing the game, the determination in step S2 results in NO, and the processing proceeds to step S3.

In step S3, the sending-condition detecting unit 44 determines whether or not the sending condition is satisfied. Here, assuming that the occurrence of a certain event is adopted as the sending condition, as described earlier, in the case where the certain event has not occurred yet, the determination in step S3 results in NO, and the processing returns to step S1. That is, the loop processing in steps S1 to S3 is repeated to continue generating metadata when needed.

On the other hand, in the case where the certain event has occurred, the determination in step S3 results in YES, and the processing proceeds to step S4. In step S4, the metadata-sending control unit 45 sends the metadata saved in the metadata saving unit 43 to the server 1.

In step S11, the correlation calculating unit 21 of the server 1 calculates the correlation, described earlier, between the metadata received from the terminal 2-2 and each piece of metadata of all the metadata stored in the metadata storage unit 13.

In step S12, the image-sending control unit 22 of the server 1 creates a list of metadata including a maximum of a predetermined number of pieces of metadata in order from those whose correlations calculated in step S11 are higher, creates, on the basis of the list, data of a play-video recommendation screen (see FIG. 2) including the individual play-videos associated with the individual pieces of metadata, and sends the data to the terminal 2-2. Alternatively, it suffices that the individual play-videos are sent from the server 1, and the play-video recommendation screen may be created at the terminal 2-2.

During this period, in step S5, the display control unit 46 of the terminal 2-2 determines whether or not data of the play-video recommendation screen has been received from the server 1. In the case where data of the play-video recommendation screen has not been received yet, the determination in step S5 results in NO, and the processing returns to step S5. That is, the loop processing in step S5 is repeated until data of the play-video recommendation screen is received. When data of the play-video recommendation screen is received during the loop processing, the determination in step S5 results in YES, and the processing proceeds to step S6.

In step S6, on the basis of the received data of the play-video recommendation screen, the display control unit 46 displays the play-video recommendation screen, shown in FIG. 2, on the display of the terminal 2-2.

In step S7, the display control unit 46 executes viewing processing. That is, the display control unit 46 accepts an operation by the player at the terminal 2-2 for selecting a desired play-video from the play-video recommendation screen. The display control unit 46 plays back the selected play-video for viewing by the player. When the viewing processing is terminated, the processing returns to step S1, and the loop processing in steps S1 to S7 is repeated until the execution of the game is terminated (until the determination in step S2 results in YES).

As described above, with the information processing system according to this embodiment, it is possible to realize a context-aware video recommendation method for recommending a play-video having high relevance in accordance with a player's action and status in a game. In this embodiment, when a player creates a play-video in a game, an action and status of the player being captured are stored in a server 1 as metadata. Then, when recommending a video to the player at the terminal 2-2 (when the sending condition is satisfied), the action and status of the player playing the game are converted into metadata having the same data structure as the above metadata, and the metadata is sent to the server 1. Then, at the server 1, the relevance between the situation faced by the player and play-videos uploaded in advance is calculated by calculating the distance between these pieces of metadata. That is, a situation in which a manner of play by another player is to be presented is detected as an event (sending condition) in the game, and in response to that event, correlations representing the degrees of relevance between the situation faced by the player and already uploaded play-videos are calculated as distances in a high-dimensional vector space. This enables recommendation of a play-video that approximates the situation of the player. As a result, videos having strong relevance are automatically distributed to the player in accordance with the current proceedings of the game. Thus, viewing of play-videos is integrated seamlessly with game experience. For example, it becomes possible to recommend a list of play-videos involving examples of successes by other players or solutions to the player when the player reaches an impasse while playing the game. Without any particular limitation about the game type, the present invention is applicable to any game genre involving a play-video capturing function.

More specifically, with the information processing system according to this embodiment, it becomes possible to recommend play-videos seamlessly in accordance with the situation in the game. Thus, players who create play-videos will have more chances that their play-videos are viewed by many users, and game players can learn new ways of playing the game. With this video recommendation mechanism, an environment for viewing play-videos of a game is implemented within that game. Therefore, it becomes possible for a company that provides game software to fully control ranking and listing of play-videos. Accordingly, as will be described later with reference to FIG. 6, it becomes possible to use the play-video recommendation function as infrastructure for distributing advertisements or official videos as well as recommending play-videos. Here, listing refers to a function of presenting a list of play-videos. Furthermore, to control listing refers to changing the ranking or display size of the list according to certain criteria.

Furthermore, the information processing system according to this embodiment also has the following advantages.

As an example, an advantage is afforded in that players can enjoy user experience integrated with game content. That is, while playing a game, a player can view a play-video at a suitable timing, without having to suspend the game play for a long time. In particular, it becomes possible to enjoy play-videos in new ways that have not been possible before, such as playing a game without researching strategies or hints for battles in advance and viewing related play-videos only when the player fails to play successfully.

There is also an advantage with respect to compatibility. Specifically, the above-described play-video recommendation function and user interface for play-video recommendation can be implemented together with any SDK for recording game videos. In other words, it is possible to construct the information processing system without depending on any specific play-video recording method.

There is also an advantage with respect to originality. Specifically, play-video recommendation coordinated with the proceedings of a game is highly original.

There is also an advantage with respect to versatility. The information processing system according to this invention is applicable to any game title that can be suspended in the course of playing. Furthermore, the play-video recommendation described above does not depend on any specific game genre and is applicable to a wide range of game genres, including action games, RPGs, shooting games, and simulation games.

Here, the inventions according to Patent Literatures 1 and 2, described earlier, relate to methods of recording play-videos and methods of recording metadata accompanying play-videos and do not involve a context-aware play-video recommendation function coordinated with the proceedings of a game. Therefore, it is not possible with Patent Literatures 1 and 2 to realize a function equivalent to the play-video recommendation described above.

Specifically, in the invention according to Patent Literature 1, game play status information is sent to a cloud in real time, and a play-video is generated in real time on the cloud side. Examples of the status information include status data in the game, and input information such as mouse clicking, screen tapping, keyboard inputs, and smartphone inclination. The information processing system according to this embodiment differs in that it realizes a context-aware play-video recommendation function coordinated with the proceedings of a game by using metadata sent to the server 1 (cloud) for calculation of correlation for video recommendation. In contrast, the invention according to Patent Literature 1 is exclusively directed to rendering on a cloud and does not involve a play-video recommendation function.

In the invention according to Patent Literature 2, metadata in a game is stored along the time axis of a play-video, which enables application to automatic editing and searching of the play-video. The information processing system according to this embodiment differs in that metadata is saved in the form of values in a high-dimensional vector space, and the correlation between a play-video and a player status is calculated by using the distance in the high-dimensional space. In contrast, the invention according to Patent Literature 2 is directed to saving a time series of metadata and a time series of video data in association with each other and does not involve technology related to calculation of a distance in a vector space, i.e., a method of calculating correlation. Therefore, the invention according to Patent Literature 2 does not involve a function for recommending a play-video created by another player in accordance with the play status of each player. Accordingly, it is not possible to realize a context-aware play-video recommendation function coordinated with the proceedings of a game.

Although an embodiment of the present invention has been described above, it is to be noted that the present invention is not limited to the above-described embodiment and that modifications, improvements, etc. within a scope in which it is possible to achieve the object of the present invention are encompassed in the present invention.

Although the metadata is represented as vectors in a high-dimensional vector space in the above-described embodiment, there is no particular limitation to this representation. That is, log data need not necessarily be represented as such vectors, and various representations may be chosen, such as histograms, nodes in a tree structure, or nodes in a network graph. In the case of histogram representation, similarity between two histograms can be calculated by using a distance criterion called histogram intersection or a distance criterion called the earth mover's distance. The distance between two nodes in a tree structure or a network graph structure can be calculated in terms of the number of hops. In the present invention, it is possible to employ an arbitrary data structure that can give a meaningful distance criterion between two distributed data.

Furthermore, although the metadata generating unit and the metadata saving unit are described as components of a terminal in the above-described embodiment, there is no particular limitation to the embodiment. For example, in the case of a scheme in which the game executing unit is a component on the server side and game execution is controlled mostly at the server, the metadata generating unit and the metadata saving unit can also be configured as components on the server side.

Furthermore, for example, although play-videos are stored in the play-video storage unit 12 of the server 1 in the above-described embodiment, there is no particular limitation to this storage location, and play-videos may be stored in a location other than the server 1 (e.g., video storage at YouTube (registered trademark)). That is, play-videos need not necessarily be uploaded to the server 1, and play-videos may be uploaded to a different location and managed at the server 1 on the basis of location data thereof (e.g., URLs (Uniform Resource Locators)). That is, the server 1 may send, to the terminal 2-2 that has sent metadata, location data of image data (play-videos, etc.) related to the game instead of directly sending the image data. Even if such an external video website is used, since play-videos are viewed from within the play-video recommendation screen in the game, the system nonetheless prevents users from leaving the game and is a closed system within the game. Furthermore, also from the viewpoint of YouTube (registered trademark), since there is no difference from accesses using ordinary browsers, there is no breach of the terms of service.

Figure 6:
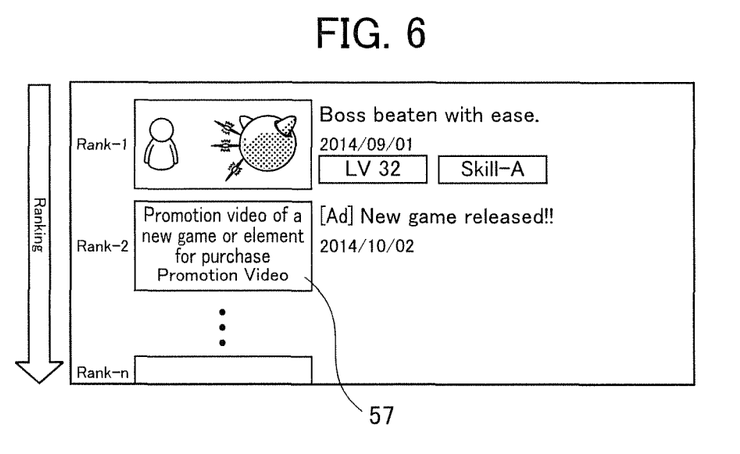
FIG. 6 is an illustration showing an example in which a recommendation list including an advertisement related to the proceedings of a user's play is displayed on the terminal in FIG. 1.

Furthermore, although what can be viewed from the play-video recommendation screen are play-videos in the above-described embodiment, what can be viewed are not limited to play-videos and may be any image related to the game. For example, as shown in FIG. 6, an advertisement related to a game play by the player, an official video from the game administrator company, etc., denoted by reference sign 57, may be included in the play-video recommendation screen. Specifically, FIG. 6 shows an example of a play-video recommendation screen in which an advertisement image is inserted together with play-videos.

Furthermore, although the sending condition (a trigger for activating the play-video recommendation function in the above-described example) for sending metadata is a failure event such as falling into a disadvantageous situation in the above-described embodiment, there is no particular limitation to the event. For example, conversely, a successful event such as clearing a stage or achieving a new personal best score may be adopted as a sending condition. In that case, the player can confirm his or her superiority by viewing successful examples of other players or use them as a reference for further skill improvements.

In other words, an information processing system according to the present invention may be embodied in various forms configured as described below, including the information processing system according to the above-described embodiment in FIG. 1. Specifically, an information processing system according to the present invention is an information processing system including a plurality of terminals that can execute a game and also including a server. The server (e.g., the server 1 in FIG. 1) includes: a management unit (e.g., the management unit 11 in FIG. 1) for managing one or more sets of data, the sets of data each including: image data related to the game or location data of the image data, and metadata including one or more kinds of attribute information that is obtained during the execution of the game; a correlation calculating unit (e.g., the correlation calculating unit 21 in FIG. 1) for calculating correlation between metadata generated by a certain terminal among the plurality of terminals and the metadata included in each of the one or more managed sets; and an image-sending control unit (e.g., the image-sending control unit 22 in FIG. 1) for executing control to send, to the certain terminal, the image data or location data included in the same set as metadata whose correlation satisfies a predetermined criterion. The certain terminal (e.g., the terminal 2-2 in FIG. 1) includes: a generating unit (e.g., the metadata generating unit 42) for generating metadata when needed during the execution of the game; a metadata sending control unit (e.g., the metadata-sending control unit 45) for executing control to send, to the server, metadata generated at a certain timing during the execution of the game; and a display control unit (e.g., the display control unit 46 in FIG. 1) for controlling display of image data or image data identified from location data sent from the server on the basis of the sent metadata.

This enables a player playing a game to readily view images that may serve as references for the game.

The series of processing steps described above may be executed either by hardware or by software. In other words, the functional configuration in FIG. 1 is only an example, and there is no particular limitation to this example. That is, it suffices that an information processing system be provided with functions that enable the execution of the above-described series of processing steps as a whole, and the configuration of functional blocks for implementing the functions is not particularly limited to the example in FIG. 1. Furthermore, the locations of the functional blocks are not particularly limited to those in FIG. 1 and may be arbitrarily set. For example, the functional blocks of the server 1 may be transferred to the terminal 2-2, etc., and conversely, the functional blocks of the terminal 2-2 may be transferred to the server 1, etc. Furthermore, each functional block may be implemented by hardware alone, by software alone, or by a combination of hardware and software.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a user, a recording medium that is provided to a user as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

EXPLANATION OF REFERENCE NUMERALS

1 Server
2-1, 2-2 Terminals
11 Management unit
12 Play-video storage unit
13 Metadata storage unit
14 Video ranking unit
21 Correlation calculating unit
22 Image-sending control unit
31 Game executing unit
32 Play-video generating unit
33 Play-video saving unit
34 Metadata generating unit
35 Metadata saving unit
41 Game executing unit
42 Metadata generating unit
43 Metadata saving unit
44 Sending-condition detecting unit
45 Metadata-sending control unit
46 Display control unit

The invention claimed is:

1. An information processing system comprising a plurality of terminals that can execute a game and also comprising a server,
wherein the server includes:
a management unit for managing one or more sets of data, the sets of data each including: image data related to the game or location data of the image data, and metadata including one or more kinds of attribute information that is obtained during the execution of the game;
a correlation calculating unit for calculating a correlation between metadata generated by a certain terminal among the plurality of terminals and the metadata included in each of the one or more managed sets; and
an image-sending control unit for executing control to send, to the certain terminal, the image data or location data included in the same set as metadata whose correlation satisfies a predetermined criterion, and
wherein the certain terminal includes:
a generating unit for generating metadata when needed during the execution of the game;
a metadata sending control unit for executing control to send, to the server, metadata generated at a certain timing during the execution of the game; and
a display control unit for controlling display of image data or image data identified from location data sent from the server on the basis of the sent metadata.

2. A server that carries out communications with a user terminal that generates metadata when needed during the execution of a game, the metadata including one or more kinds of attribute information, the server comprising:
a management unit for managing one or more sets of data, the sets of data each including: image data related to the game or location data of the image data, and the metadata;
a correlation calculating unit for calculating a correlation between metadata generated by the user terminal at a certain timing and the metadata included in each of the one or more managed sets; and
a sending unit for sending, to the user terminal, the image data or location data included in the same set as metadata whose correlation satisfies a predetermined criterion.

3. The server according to claim 2,
wherein the metadata includes metadata representing a progress status of the game and metadata representing a status of a player in the game.

4. The server according to claim 2,
wherein the metadata is represented by a vector in a high-dimensional vector space, and
wherein the correlation calculating unit calculates, as the correlation, the distance, in the high-dimensional vector space, between a vector representing the obtained metadata and a vector representing the metadata included in each of the one or more managed sets.

5. The server according to claim 2,
wherein the certain timing at which the user terminal generates metadata is a timing at which a certain event occurs during the execution of the game.

6. The server according to claim 2,
wherein the image data or image data identified from the location data managed by the management unit includes image data representing the proceedings of the game executed in the past by at least one of a plurality of terminals.

7. The server according to claim 2,
wherein the image data or image data identified from the location data managed by the management unit includes image data representing an advertisement or official announcement related to the game.

8. A non-transitory computer readable medium storing a program for causing a computer that executes control including communications with a user terminal that generates metadata when needed during the execution of a game, the metadata including one or more kinds of attribute information, to execute control processing comprising:
a management step of managing one or more sets of data, the sets of data each including: image data related to the game or location data of the image data, and the metadata;
a correlation calculating step of calculating a correlation between metadata generated by the user terminal at a certain timing and the metadata included in each of the one or more managed sets; and
a sending control step of executing control to send, to the user terminal, the image data or location data included in the same set as metadata whose correlation satisfies a predetermined criterion.

9. A non-transitory computer readable medium storing a program for a computer that controls a terminal that carries out communications with a server having:

a management function of managing one or more sets of data, the sets of data each including: image data related to a game or location data of the image data, and metadata including one or more kinds of attribute information that is obtained during the execution of the game; and a sending function of sending, to another terminal, the image data or location data included in the same set as metadata whose correlation with metadata generated by the other terminal satisfies a predetermined criterion among the metadata included in the one or more managed sets, the program causing the computer to execute control processing comprising:

a generating step of generating metadata when needed during the execution of the game;

a communication control step of executing control to send, to the server, metadata generated at a timing satisfying a predetermined condition during the execution of the game, and to receive image data or location data sent from the server by using the sending function on the basis of the sent metadata; and a display control step of controlling display of the received image data or image data identified from the received location data.

10. An information processing method that is executed by an information processing apparatus that carries out communications with a server having:

a management function of managing one or more sets of data, the sets of data each including: image data related to a game or location data of the image data, and metadata including one or more kinds of attribute information that is obtained during the execution of the game; and a sending function of sending, to another terminal, the image data or location data included in the same set as metadata whose correlation with metadata generated by the other terminal satisfies a predetermined criterion among the metadata included in the one or more managed sets, the information processing method comprising:

a generating step of generating metadata when needed during the execution of the game;

a communication control step of executing control to send, to the server, metadata generated at a timing satisfying a predetermined condition during the execution of the game, and to receive image data or location data sent from the server by using the sending function on the basis of the sent metadata; and a display control step of controlling display of the received image data or image data identified from the received location data.

* * * * *